(12) United States Patent
Gupta et al.

(10) Patent No.: US 9,183,570 B2
(45) Date of Patent: Nov. 10, 2015

(54) LOCATION BASED CONTENT MATCHING IN A COMPUTER NETWORK

(75) Inventors: Ankur Gupta, Bangalore (IN); Smita Hashim, Saratoga, CA (US)

(73) Assignee: Google, Inc., Mountain View, CA (US)

( * ) Notice: Subject to any disclaimer, the term of this patent is extended or adjusted under 35 U.S.C. 154(b) by 64 days.

(21) Appl. No.: 13/601,566

(22) Filed: Aug. 31, 2012

(65) Prior Publication Data

US 2015/0242898 A1    Aug. 27, 2015

(51) Int. Cl.
*G06F 17/30* (2006.01)
*G06Q 30/02* (2012.01)

(52) U.S. Cl.
CPC ........ *G06Q 30/0261* (2013.01); *G06F 17/3087* (2013.01); *G06Q 30/0256* (2013.01)

(58) Field of Classification Search
CPC ................... G06F 17/30241; G06F 17/30672; G06F 17/30864
See application file for complete search history.

(56) References Cited

U.S. PATENT DOCUMENTS

| | | | |
|---|---|---|---|
| 7,257,570 B2 * | 8/2007 | Riise et al. ..................... 707/706 |
| 7,774,348 B2 * | 8/2010 | Delli Santi et al. ............ 707/748 |
| 8,260,665 B2 | 9/2012 | Foladare et al. | |
| 8,280,624 B2 * | 10/2012 | Riise et al. ..................... 701/409 |
| 2005/0228797 A1 | 10/2005 | Koningstein et al. | |
| 2007/0061195 A1 | 3/2007 | Liu et al. | |
| 2008/0086368 A1 | 4/2008 | Bauman et al. | |
| 2008/0154856 A1 * | 6/2008 | Riise et al. ........................ 707/3 |
| 2008/0201242 A1 | 8/2008 | Minnis et al. | |
| 2008/0243821 A1 * | 10/2008 | Delli Santi et al. ............... 707/5 |
| 2008/0249832 A1 | 10/2008 | Richardson et al. | |
| 2009/0077495 A1 | 3/2009 | Bhat et al. | |
| 2009/0112688 A1 | 4/2009 | Hart et al. | |
| 2009/0319187 A1 | 12/2009 | Deeming et al. | |
| 2009/0327084 A1 | 12/2009 | Patton et al. | |
| 2011/0054998 A1 | 3/2011 | Feuerstein et al. | |
| 2011/0119133 A1 | 5/2011 | Igelman et al. | |
| 2011/0131503 A1 | 6/2011 | Graham, Jr. | |
| 2011/0167077 A1 * | 7/2011 | Govani et al. .................. 707/767 |
| 2011/0191364 A1 * | 8/2011 | LeBeau et al. ................. 707/767 |
| 2011/0258148 A1 | 10/2011 | Gao et al. | |
| 2011/0289025 A1 | 11/2011 | Yan et al. | |
| 2012/0130804 A1 | 5/2012 | Guo et al. | |
| 2013/0006738 A1 | 1/2013 | Horvitz et al. | |
| 2013/0325625 A1 | 12/2013 | Morgan et al. | |

OTHER PUBLICATIONS

"Fwix Introduces New Geotagger App. to Organize Media Content by Location," Entertainment Close-Up, Jun. 18, 2011, 1 page.

(Continued)

*Primary Examiner* — Yuk Ting Choi
(74) *Attorney, Agent, or Firm* — Armstrong Teasdale LLP

(57) ABSTRACT

Systems and methods of providing information via a computer network responsive to a request are provided. Keyword terms including a content keyword and a geographic location operator can be received via a computer network. A geographically modified keyword can be determined from the keyword terms. The geographically modified keyword indicates a product or service, and indicates a geographic location associated with the geographic location operator. A search query can be received from a user interface of a computing device, and a geographic location term in the search query can be identified. A geographic location term in a search query can be matched with the geographically modified keyword, with the geographic location term being a variant of the geographic location operator. Content can be obtained and provided from a data processing system to the user interface via the computer network, for display at the user interface.

20 Claims, 4 Drawing Sheets

(56) References Cited

OTHER PUBLICATIONS

Amitay et al., "Web-a-Where: Geotagging Web Content", SIGIR (Special Interest Group on Information Retrieval), Jul. 25-29, 2004, pp. 273-280, 8 pages.
Office Action in U.S. Appl. No. 13/584,523 dated Jun. 26, 2014.
Office Action on U.S. Appl. No. 13/746,980 dated Oct. 24, 2014.
Office Action on U.S. Appl. No. 13/853,775 dated Nov. 3, 2014.
Phill Leggier, "Making Web Site Behavior Adaptive," Mar. 12, 2008, Data and Behavioral Insiderwww.mediapost.com, http://www.mediapost.com/publications/article/78358/making-web-site-behavioradaptive.html.

* cited by examiner

Ad extensions

You can use this optional feature to include relevant business information with your ads. Take a tour.

Location ⊙ ● Extend my ads and my keywords with location information
⊙ Extend my ads with location information ▫ Use addresses from another account ⊙
▫ Use manually entered addresses ⊙

Product ⊙ ▫ Extend my ads with relevant product details from another account ⊙
Sitelinks ⊙ ▫ Extend my ads with links to sections of my site
Call ⊙ ▫ Extend my ads with a phone number

LOCATION BASED CONTENT MATCHING IN A COMPUTER NETWORK

BACKGROUND

Purveyors of information can access a networked environment such as the Internet to make information available to potential customers or viewers. Given the breadth of information available on the Internet, advertisers can attempt to direct their information to particular customers or a particular group of customers. A potential customer can access a networked environment such as the Internet in an attempt to obtain sought after information. For example a user can access a web page of the Internet through a web browser to receive information about nearly any topic of interest to the user.

SUMMARY

At least one aspect is directed to a computer implemented method of providing selected information via a computer network. The method receives keyword terms via the computer network. The keyword terms include a content keyword and a geographic location operator. The method determines a geographically modified keyword from the keyword terms. The geographically modified keyword indicates a geographic location that corresponds to the geographic location operator, and indicates at least one of a product and a service that corresponds to the content keyword. The geographically modified keyword can be provided for storage in a database of a data processing system coupled to the computer network. A search query can be received from a computing device, and a geographic location term in the search query is identified. The method matches the geographic location term in the search query with the geographically modified keyword, with the geographic location term in the search query being a variant of the geographic location operator. The method can identify content associated with at least one of the product and the service, and can provide the content for display at a user interface of the computing device.

At least one aspect is directed to a system of providing information via a computer network. The system includes one or more data processors; and one or more storage devices that when executed by the one or more data processors, cause the one or more data processors to perform operations including receiving keyword terms via the computer network. The keyword terms include a content keyword and a geographic location operator. The operations also include obtaining a geographically modified keyword from the keyword terms. The geographically modified keyword indicates a geographic location that corresponds to the geographic location operator, and indicates at least one of a product and a service that corresponds to the content keyword. The operations also include receiving a search query from a computing device, and identifying a geographic location term in the search query. The operations also include matching the geographic location term in the search query with the geographically modified keyword, where the geographic location term in the search query is a variant of the geographic location operator. The operations also include identifying content associated with at least one of the product and the service, and providing the content for display at a user interface of the computing device via the computer network.

At least one aspect is directed to a computer readable storage device storing instructions that when executed by one or more data processors, cause the one or more data processors to perform operations including receiving keyword terms via a computer network. The keyword terms include a content keyword and a geographic location operator. The operations include determining a geographically modified keyword from the keyword terms. The geographically modified keyword indicates a geographic location that corresponds to the geographic location operator, and indicates at least one of a product and a service that corresponds to the content keyword. The operations include receiving a search query from a computing device, and identifying a geographic location term in the search query. The operations include matching the geographic location term in the search query with the geographically modified keyword, where the geographic location term in the search query is a variant of the geographic location operator. The operations also include identifying content associated with at least one of the product and the service responsive to the search query, and providing the content for display at a user interface of the computing device.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 2 is a screen shot depicting a user interface for providing information via a computer network, according to an illustrative implementation;

DETAILED DESCRIPTION

Figure 1:
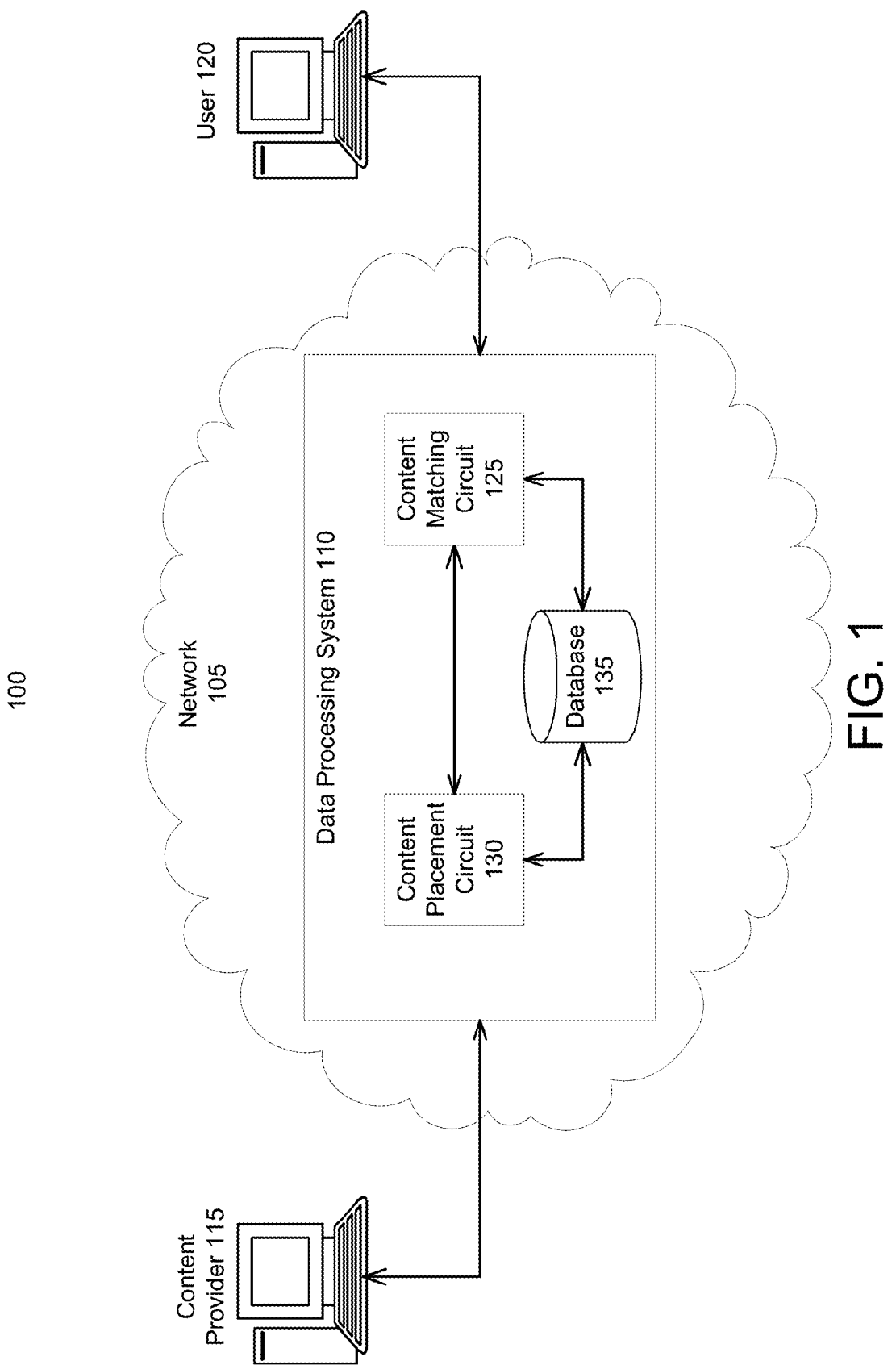
FIG. 1 is a block diagram of an example environment to evaluate information received via a computer network, according to an illustrative implementation.

Following below are more detailed descriptions of various concepts related to, and embodiments of, methods, apparatuses, and systems for providing information via a computer network. The various concepts introduced above and discussed in greater detail below may be implemented in any of numerous ways, as the described concepts are not limited to any particular manner of implementation. Examples of specific implementations and applications are provided primarily for illustrative purposes.

Aspects and embodiments of the present disclosure provide content to a user via a computer network based at least in part on geographic location information. A content provider such as an advertiser seeking to advertise a product or service in a networked environment such as the Internet provides information about their product, for example as part of an online advertising campaign. This information can include information about the product or service as well as an indication of the geographic location where the product or service is available. For example, the geographic location can be the name of a city where the advertiser has a business.

A data processing system receives the information from the content provider, including the location information. For example, the data processing system can receive geographic location information that a content provider has a product or service available in "San Francisco." In this example, the data processing system recognizes "San Francisco" as well as variants of "San Francisco" as indicating the same geographic location. The variants, as discussed further herein, can include abbreviations, nicknames, misspellings, or alternate spellings of a geographic location such as "San Francisco."

The data processing system can receive a search query from a user seeking information about a product or service. The user is potentially a recipient of an advertisement for the product or service of the content provider. The search query may include geographic location information. For example, the user may request information about a service in the "bay area" or in "San Fran" without providing further geographic location details.

The data processing system can identify a correlation or match between the information provided by the content provider and the search query received from the user based at least in part on the geographic information received from the content provider and from the user. Based on this match, the data processing system can provide content (e.g., search results or an advertisement) via the computer network for display at an electronic computing device to the user. In this example, the geographic location information "San Francisco" received from the content provider can be determined to match the geographic location term "bay area" received from the user.

In this example, "San Francisco" and "bay area" can be identified as variants of the same or a similar geographic location, or another way to refer to the same place. As discussed further herein, the data processing system can identify a geographic location match between different terms such as "San Francisco" and "bay area" by generating location criteria identifiers that encompass multiple terms, words, alternate phrases, or other variants to identify the same geographic location, and by identifying matches between various criteria identifiers that refer to the same area.

FIG. 1 illustrates an example system 100 to evaluate information received via a computer network 105 according to an implementation of the present disclosure. The network 105 can include computing networks such as the Internet, local, metro, or wide area networks, intranets, and other communication networks such as mobile telephone networks. The system 100 can also include data processing system 110. The data processing system 110 can include at least one processor or logic device to communicate with at least one content provider 115, for example to receive advertisements or other information that the content provider 115 makes available for display via the network 105. The system 100 can also include at least one user 120. For example, the data processing system 110 can receive a search query from the user 120 via the network 105, and the data processing system 110 can provide content to the user 120 responsive to the search query. In some implementations, the data processing system 110 includes one or more data processors; and one or more storage devices (e.g., a database) storing instructions that when executed by the one or more data processors, cause the one or more data processor to perform operations and acts described herein.

In one implementation, the data processing system 110 receives information from the content provider 115, for example via the network 105. The content provider 115 can be a person, merchant, or representative of a company that accesses a computing device to provide information to the data processing system 110. For example, the content provider 115 may provide information including keyword terms to the data processing system 110 as part of an online campaign (e.g., an ad campaign) to provide content items such as advertisements to the user 120 via the network 105. The received information can include at least one content keyword associated with a product or service offered by the content provider 115. For example, if the content provider 115 is a restaurant, the data processing system 110 can receive a content keyword "pizza" from the content provider.

The information received via the network 105 by the data processing system 110 from the content provider 115 can also include at least one geographic location operator that indicates a geographic location where the product or service may be found. For example, the content provider 115 can indicate that their product (e.g., "pizza") is available in "San Francisco." The geographic location operator can be identified as location information. In this example, the content provider 115 can identify "San Francisco" as being a geographic location operator. The content provider 115 may be running an advertising campaign on the network 105 that focuses on the San Francisco area, and the content provider 115 may wish to provide advertisements (via network 105) to the user 120 when the user 120 performs a search query that indicates an interest in San Francisco. The user 120 may express this geographic location interest in various ways, using alternate names or spellings to refer to the San Francisco area. The data processing system 110 can determine that the variants of San Francisco entered by the user match the location "San Francisco" provided by the content provider 115 when the user enters a variant of "San Francisco" (e.g., "San Fran") and does not recite the same indication of San Francisco as the content provider 115.

In one implementation, the geographic location operator received from the content provider 115 is not explicitly designated as such, and the data processing system 110 identifies a geographic location operator from the information provided by the content provider 115. The keyword terms can indicate a product or service, as well as at least one geographic location associated with the product or service. The keyword terms can include content keywords that indicate what the product or service is or relates to, and geographic location operators that indicate where the product or service is located without indicating what that product or service is.

Thus, in one implementation, the data processing system 110 receives information from the content provider 115 that includes at least one content keyword identifying a product or service, and at least one geographic location operator that identifies at least one geographic location. The content keyword and the geographic location operator can be different terms. For example, the content keyword can be "pizza" and the geographic location operator can be "San Francisco." The location can be selected by the content provider 115 for various reasons, such as a location where the product or service is available, a location where the content provider 115 is located, or a location where the content provider 115 wishes to focus a marketing or advertisement campaign.

The data processing system 110 can include logic devices such as processors, or logic circuitry such as at least one content matching circuit 125 and at least one content placement circuit 130 in communication with each other and with at least one database 135. Each of the content matching circuit 125 and the content placement circuit 130 can include at least one processor. In one implementation, the data processing system 110 includes at least one server whose logic or memory devices include the content matching circuit 125 or the content placement circuit 130.

The data processing system 110 can store the information received from the content provider 115 (e.g., keywords, location operators, or other content such as an advertisement) in the database 135. In one implementation, the data processing system 110 determines a geographically modified keyword from the keyword terms. The geographically modified keyword can indicate the content identified in the content keyword, and can indicate a geographic area identified by the geographic location operator. For example, the data processing system 110 can determine a location criteria identifier that represents the geographic location indicated by the geographic location operator provided by the content provider 115.

For example, the data processing system 110 can receive keyword terms including a content keyword (e.g., "pizza") and geographic location operator (e.g., "San Francisco") from the content provider 115 via the network 105. In this example, the data processing system 110 generates a location criteria identifier associated with the geographic location operator "San Francisco." In one implementation, a plurality of variants of the geographic location operator (e.g., variants of "San Francisco") can be represented by the same location criteria identifier. The variants can include abbreviations, alternate spellings, misspellings, nicknames, or alternate names of the same location. For example, variants of "San Francisco" can include "S.F." "sf" "San Fran" "San Franisco" (misspelled), the "city by the bay" or the "bay area." In this example, a location criteria identifier can represent the geographic location operator and its variants to indicate the same geographic area. The geographic location need not be a municipal boundary. Geographic location operators and other geographic terms can be based on past or present political boundaries, television or radio market areas, geographic characteristics such as a particular mountain, mountain range, lake, peninsula, or latitude and longitude coordinates.

The location criteria identifier can be represented as a numerical string. For example, the location terms "San Francisco," "S.F.," "san fran" and other variants intended to indicate the greater San Francisco area can be represented by a single location criteria identifier that indicates the San Francisco area In this example, the data processing system 110 identifies location terms in the geographically modified keyword and obtains the location criteria identifier corresponding to that location. The numerical string of the location criteria identifier is an example and the location criteria identifier can be represented by other character strings and representations, and in other formats.

In one implementation, the data processing system 110 can use the full context of information received from the user 120 to identify the location criteria identifier. This may include the search term query, as well as any location preferences that the user 120 may have affirmatively opted to provide to the data processing system 110. To determine a match between the location term in the search query and the location criteria identifier, the data processing system 110 can access a geographic data index (e.g., from the database 135) that identifies various cities, metropolitan areas, or regions that may be selected. The data processing system 110 can assign (or obtain from the database 135) location criteria identifiers for these locations. For example, the data processing system 110 can extract the location information from the full context of the information received from the user by using a reverse index that matches geographic location names with location criteria identifiers, which can be unique identifiers for example.

The data processing system 110 can extract the location information including identification of variant terms of a location from other sources, such as web page content. In one implementation, the data processing system 110 can evaluate web page content to associate two or more variants with one geographic location. For example, the data processing system 110 can determine that one or more web pages include phrases that correspond to the same location. In this example the data processing system 110 can identify "SF" as a variant of "San Francisco" by analyzing content of a web page that contains both "SF" and "San Francisco" in a manner that indicates that they are associated with the same location. The data processing system 110 can identify the words of a received search query that correspond to a location, and can identify the location criteria identifier for that location.

The geographically modified keyword, which may include a content keyword (e.g., "pizza") and a location criteria identifier (e.g., an identifier that represents the San Francisco area) can be stored in the database 135, for example in canonical form. In one implementation, different location terms referring to the same geographic location are represented by the same location criteria identifier.

In some implementations, the data processing system 110 receives a search query from the user 120. For example, a person at a computing device (e.g., computer, personal digital assistant, smart phone, or tablet computer) performs a search query on the network 105 to obtain information. The user 120 can access a web page and enter a search query into that web page. The data processing system 110 can receive the terms of the search query from the user 120, and can identify a geographic location term from the search query.

For example, the user 120 may enter a search query for "pizza san fran." The data processing system 110 can determine that the terms "san fran" are geographic location terms. The data processing system 110 can also determine that "pizza" is a content keyword. In this example, the data processing system 110 obtains the location criteria identifier for the location "san fran." The location criteria identifier for "san fran" identifies the San Francisco area. Thus, in this example, the same location criteria identifier that indicates the San Francisco area can be associated with the search query received from the user 120 for any geographic location term (e.g., "San Francisco," "San Fran" or other variants of San Francisco) provided by the user 120.

In one implementation, the content matching circuit 125 matches the geographically modified keyword with information in the search query received from the user 120. With reference to the above example, the content matching circuit 125 can identify a match between the geographically modified keyword from the content provider and the search query received from the user 120 (e.g., "pizza san fran"). In this example, the geographic location term in the search query ("san fran") is a variant of the geographic location operator ("San Francisco") provided by the content provider 115.

Thus, the content matching circuit 125 can identify a match between keyword terms received from the content provider 115 and the terms of the search query received from the user 120 with the geographic location operator of the keyword terms and the geographic location of the search terms being variants of each other that indicate a same geographic location. In this implementation, the content provider 115 can provide keyword terms that include a single variant of a geographic location, and the data processing system 110 can match those keyword terms with search queries from the user 120 that have different variants that identify the same geographic location. Thus, the data processing system can identify a match between the keyword terms of the content provider 115 (e.g., "pizza loc: San Francisco") and the terms of the search query (e.g., "pizza san fran") with the geographic indications in these two data sets being variants that indicate the same or a similar geographic location.

The data processing system 110 can receive keyword terms from the content provider that identify multiple different geographic locations. For example, the keyword terms of the content provider can indicate the content term "pizza" and the geographic location operators "San Francisco" and "San Jose." This may indicate that a restaurateur is advertising for pizzerias in both San Francisco and San Jose. In this example, the data processing system can determine a location criteria identifier for the San Francisco area, and a different location criteria identifier for the San Jose area. Variants of San Francisco, for example received as part of a search query, can be indicated by the San Francisco location criteria identifier, and variants of San Jose can be indicated by the San Jose location criteria identifier. In one example, a single location criteria identifier can be generated that encompasses variants of both geographic location operators (e.g., "San Francisco" and "San Jose"), such as a location criteria identifier corresponding to a region, e.g., "northern California."

In one implementation, the content provider 115 can provide a custom geographic location operator, such as all locations where the content provider 115 has a store. In this example, the content provider may have stores in Los Angeles and New York, and the data processing system 110 can generate a location criteria identifier for Los Angeles and its variants, and another location criteria identifier for New York and its variants, or a single location criteria identifier for both locations.

In one implementation, the content placement circuit 130 can obtain or otherwise access content associated with the product or service represented by the keyword terms received from the content provider 115. For example, the content matching circuit determines a match between the keyword terms of the content provider 115 and the search query of the user 120. Responsive to the match, the content placement circuit 130 can provide content, such as an advertisement associated with the content provider 115 to the user 120 via the network 105. The content can be retrieved from the database 135 or from other databases or servers associated with the content provider 115, for example.

Continuing with the above "pizza" and "San Francisco" example, responsive to the content matching circuit 125 identifying a match, the content placement circuit can provide an advertisement for a pizzeria in San Francisco owned by the content provider 115 to the user 120. The advertisement can be provided via the network 105 for display on a computing device to the user 120. In this example, this advertisement is responsive to the search query performed by the user 120 for "pizza san fran" and is determined by the data processing system 110 to match the keyword terms "pizza San Francisco" provided by the content provider 115 with "san fran" being and "San Francisco" being variants of the San Francisco geographic area.

In some implementations, the content keywords from the content provider 115 are exactly matched (e.g., "pizza") with the query term (e.g., also "pizza" in this example). These matches can be exact matches or expanded matches, for example where "pizza" is determined to match "pizzeria" or phrase matches where "pizza San Francisco" is determined to match "san fran pizza."

FIG. 2 is a screen shot depicting a user interface 200 for providing information via a computer network such as network 105 of FIG. 1. With reference to FIGS. 1 and 2, the content provider 115 can provide information to the data processing system, for example as part of an advertising campaign to provide advertisements to selected users (e.g., user 120) via the network 105. In one implementation, the data processing system 110 can prompt the content provider 115 for information regarding the ad campaign, such as details of the product or service offered by the content provider 115, and other information such as the geographic location selected by the ad campaign.

In one implementation, the content provider 115 can access the user interface 200 provided by the data processing system 110, for example by accessing a web page on the network 105. The content provider can provide location information, for example by selecting an option to "extend ads and keywords with location information" or to "extend ads with location information" for example. The requests for location information can be provided in other forms and using other terms. In some implementations, the user interface 200 can give the content provider 115 the option of manually entering an address to identify a geographic location, or to use an address previously provided as part of the same or a previous ad campaign of the content provider 115. Further, the user interface 200 can prompt the content provider 115 to include previously provided product or service details, for example by prompting the content provider 115 to extend ads with previous product details, portions of a web page operated by the content provider 115, or the phone number of the content provider 115.

The data processing system 110 can receive the information provided by the content provider 115. In one implementation, the data processing system receives this information, which includes at least keyword terms provided by the content provider 115. The keyword terms received via user interface 200 can include content keywords (e.g., "pizza") and the geographic location operator (e.g., "San Francisco"). The geographic location operator may be manually entered into the user interface 200, or instructions can be entered into the user interface 200 instructing the data processing system 110 to obtain the geographic location operator from other information previously provided by the content provider 115, such as a billing address. In some implementations, the data processing system 110 can suggest geographically modified keywords that can be displayed by the user interface 200. For example, the keyword terms received via the user interface 200 may include content keyword "pizza" and the geographic location operator "san francisco", and the data processing system 110 can provide the geographically modified keyword "pizza loc:SanFrancisco" for display at the user interface 200 as a suggested geographically modified keyword, which the content provider 115 can approve or reject. In this example, the data processing system 110 modifies an original keyword into a geographically modified keyword.

In one implementation, the content provider 115 can provide a modifier together with the geographic location operator. The modifier can be indicated by a character. For example, the data processing system can receive a geographic location operator having a modifier that can indicate that variants of San Francisco, such as misspellings or a near match are intended to be included in the geographic location. In one example, the modifier indicates that the geographic location selected by the content provider 115 includes adjacent areas. For example, the geographic location operator for San Francisco that also includes a modifier can encompass areas near San Francisco, such as the nearby cities of Oakland or Palo Alto. In one implementation, the data processing system determines that such adjacent or nearby areas are included in the selected geographic location in the absence of any modifier to the information received from the content provider 115.

Figure 3:
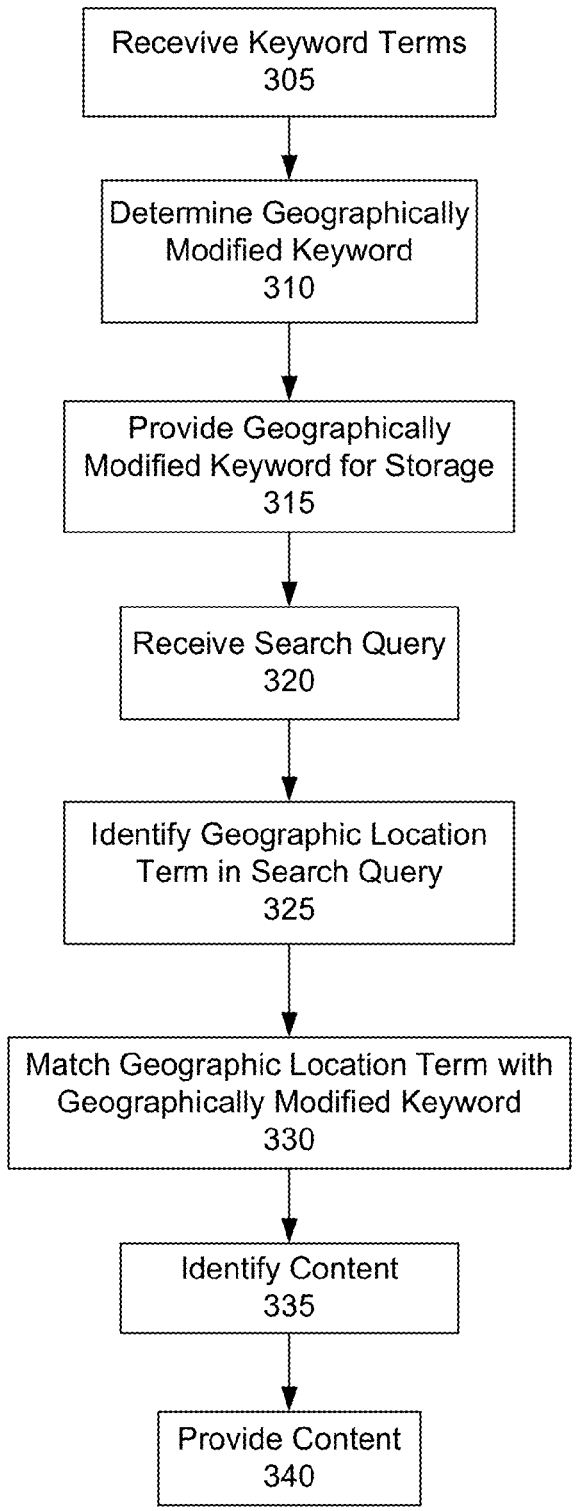
FIG. 3 is a flow diagram depicting a method of providing information on a computer network, according to an illustrative implementation.

FIG. 3 is a flow diagram depicting a method 300 of providing information on a computer network. In one implementation, the method 300 receives keyword terms (BLOCK 305). The keyword terms can be received via a computer network. In one implementation, the received keyword terms include at least one content keyword and at least one geographic location operator. The keyword terms can be received by a data processing system as part of a campaign on a network such as the Internet to provide selected advertisements or other content to users of the network. The keyword terms, including the content keywords and geographic location operators can be received directly from a content provider as part of an ad campaign, or can be obtained indirectly, for example from information previously provided by a content provider, or based on network activity or deduced physical locations of the content provider.

In one implementation, the method 300 determines a geographically modified keyword from the keyword terms (BLOCK 310). The geographically modified keyword can indicate a product or service offered by the content provider, as well as a geographic location that corresponds to the geographic location operator received at BLOCK 305. For example, the received keyword terms can include a geographic location operator indicating that the content provider is providing advertisements to the San Francisco area, e.g., "loc: San Francisco." In one implementation, determining the geographically modified keywords (BLOCK 310) includes converting the geographic location operator into a geographically modified keyword that represents the area of San Francisco regardless of the keyword term used to indicate an interest in the San Francisco area. For example, the method 300 can determine or identify the same geographically modified keyword for any variant keyword term that represents the San Francisco area. The portion of the geographically modified keyword indicative of location can be represented by a location criteria identifier, for example in the form of a numerical string. Another portion of the geographically modified keyword can include a content keyword to indicate the product or service subject to an ad campaign, for example. The determined geographically modified keyword (BLOCK 310) can include a suggested alternative to the keyword terms received (BLOCK 305) by the data processing system. For example, received keyword terms (BLOCK 305) can include a content keyword and geographic indication (e.g., "pizza san francisco"). Responsive to this input, the data processing system can determine the geographically modified keyword (e.g., "pizza loc:San Francisco") and can provide this geographically modified keyword for display to the content provider as a suggested geographically modified keyword that the content provider can select for use in an online campaign, modify, or reject.

The method 300 can include an act of providing at least part of the geographically modified keyword for storage in a database (BLOCK 315). For example, terms of the geographically modified keyword that indicate a type of produce or service associated with the content provider, or that indicate the geographic location, can be provided to a database for storage by the database, with the database being accessible by a data processing system.

In one implementation, the method 300 receives a search query (BLOCK 320). For example, a search query can be received from a user of a computing device via a network such as the Internet. The method 300 can identify a geographic location term in the search query (BLOCK 325). In one implementation the geographic location term in the search query received from a user is a variant of the geographic location operator received from the content provider. For example, the content provider can provide keyword terms having a geographic location operator "Los Angeles" and the user can provide a query having a geographic location term "LA."

The method 300 can identify a match between the geographic location terms from the search query with the geographic location operator from the content provider (BLOCK 330). For example, the method 300 can generate a location criteria identifier that corresponds to the Los Angeles area for any variant of Los Angeles. In this example, the location criteria identifier for "Los Angeles" and the location criteria identifier for "LA" or another variant can match, e.g., one location criteria identifier can indicate different variants of Los Angeles.

In one implementation, the method 300 matches the geographic terms (BLOCK 330) subsequent to matching content keywords received from the content provider with keywords of the search query that also indicate content. For example, a generic location operator can indicate any location or the absence of a geographic location restriction. In this example, a plurality of matches between content provider information and the terms of the search query can be determined based on the content keywords (e.g., pizza) for any location. Subsequently, the set of matches can be narrowed by matching the geographic terms (BLOCK 330) to determine that the information from the content provider matches the search query.

The method 300 can identify content associated with the product or service indicated in the geographically modified keyword, which can be based on information received from the content provider (BLOCK 335). In one implementation, the content is identified (BLOCK 335) responsive to the act of matching the geographic location term from the search query with the geographic location operator from the content provider (BLOCK 330). For example, a data processing system can obtain content (BLOCK 335) such as an advertisement from a database of the data processing system or the content provider. The method 300 can provide the content for display on a computing device associated with a user, via the computer network (BLOCK 340). For example, the content can be provided (BLOCK 340) to a handheld electronic device, tablet computer, mobile phone, or laptop or desktop computer for display to a user. The provided content (BLOCK 340) can be responsive to the received search query (BLOCK 320).

Figure 4:
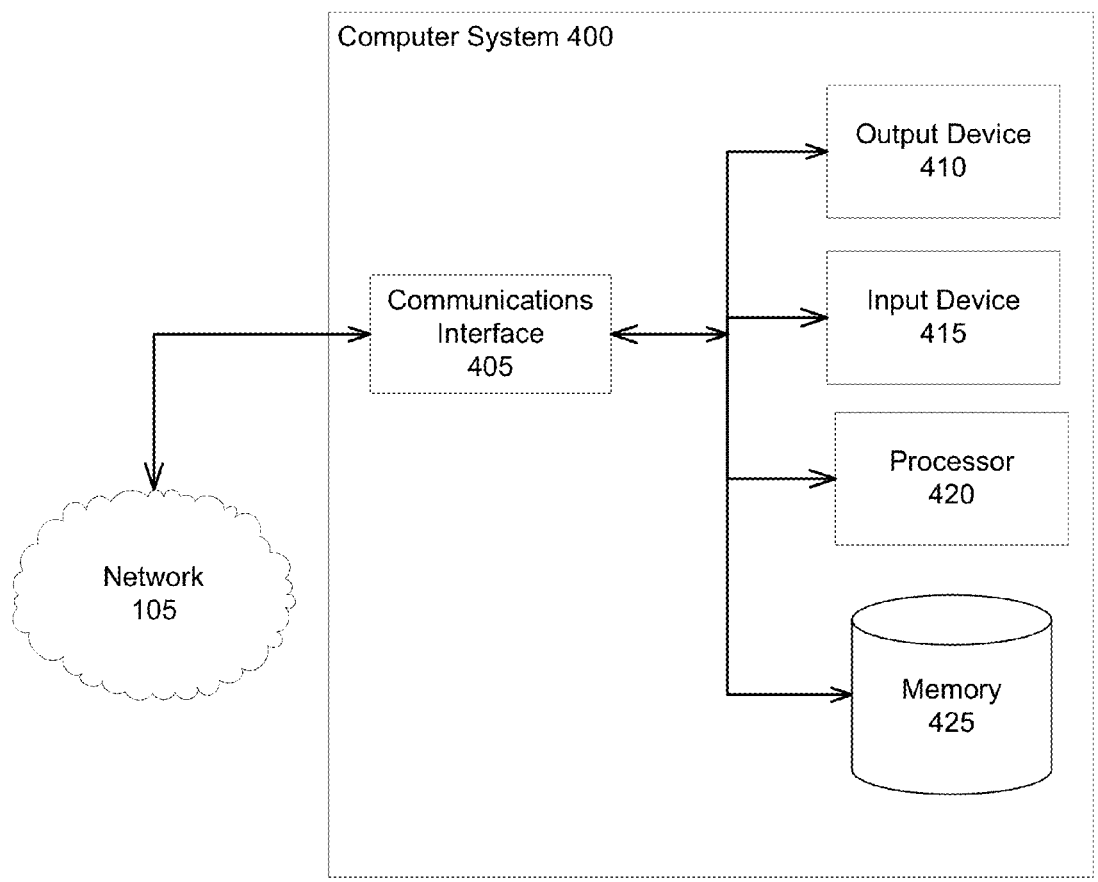
FIG. 4 is a block diagram illustrating a general architecture for a computer system that may be employed to implement various elements of the systems and methods described and illustrated herein, according to an illustrative implementation.

FIG. 4 shows the general architecture of an illustrative computer system 400 that may be employed to implement any of the computer systems discussed herein (including the system 100 and its components such as data processing system 110 of FIG. 1) in accordance with some embodiments. The computer system 400 can be used to provide information and to match user queries with information received from content providers via a computer network, such as network 105. The computer system 400 of FIG. 4 can comprise one or more processors 420 communicatively coupled to memory 425, one or more communications interfaces 405, and one or more output devices 410 (e.g., one or more display units) and one or more input devices 415. The processors 420 can be included in the data processing system 110 or the other components of the system 100 such as the content placement circuit 130 or the content matching circuit 125.

In the computer system 400 of FIG. 4, the memory 425 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, memory 425 can include the database 135. The processor(s) 420 shown in FIG. 4 may be used to execute instructions stored in the memory 425 and, in so doing, also may read from or write to the memory various information processed and or generated pursuant to execution of the instructions.

The processor 420 of the computer system 400 shown in FIG. 4 also may be communicatively coupled to or control the communications interface(s) 405 to transmit or receive various information pursuant to execution of instructions. For example, the communications interface(s) 405 may be coupled to a wired or wireless network, bus, or other communication means and may therefore allow the computer system 400 to transmit information to and/or receive information from other devices (e.g., other computer systems). While not shown explicitly in the system of FIG. 1, one or more communications interfaces facilitate information flow between the components of the system 100. In some implementations, the communications interface(s) may be configured (e.g., via various hardware components or software components) to provide a website as an access portal to at least some aspects of the computer system 400. Examples of communications interfaces 405 include user interfaces (e.g., web pages) having content (e.g., advertisements) selected by the data processing system 110 and provided by the data processing system 110 to the user 120 for placement on web pages for display on an interface of a computing device to the user 120.

The output devices 410 of the computer system 400 shown in FIG. 4 may be provided, for example, to allow various information to be viewed or otherwise perceived in connection with execution of the instructions. The input device(s) 415 may be provided, for example, to allow a user to make manual adjustments, make selections, enter data or various other information, or interact in any of a variety of manners with the processor during execution of the instructions. Additional information relating to a general computer system architecture that may be employed for various systems discussed herein is provided at the conclusion of this disclosure.

Embodiments of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content placement circuit 130 and the content matching circuit 125 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 400 or system 100 can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of the systems and methods described herein. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. For example, the content placement circuit 130 and the content matching circuit 125 can be a single module, a logic device having one or more processing circuits, or part of a search engine.

Having now described some illustrative implementations and embodiments, it is apparent that the foregoing is illustrative and not limiting, having been presented by way of example. In particular, although many of the examples presented herein involve specific combinations of method acts or system elements, those acts and those elements may be com- bined in other ways to accomplish the same objectives. Acts, elements and features discussed only in connection with one embodiment are not intended to be excluded from a similar role in other implementations or embodiments.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate embodiments consisting of the items listed thereafter exclusively. In one embodiment, the systems and methods described herein consist of one, each combination of more than one, or all of the described elements, acts, or components.

Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements to single or plural configurations. References to any act or element being based on any information, act or element may include embodiments where the act or element is based at least in part on any information, act, or element.

Any implementation disclosed herein may be combined with any other implementation or embodiment, and references to "an implementation," "some implementation," "an alternate implementation," "various implementation," "one implementation" or the like are not necessarily mutually exclusive and are intended to indicate that a particular feature, structure, or characteristic described in connection with the embodiment may be included in at least one implementation or embodiment. Such terms as used herein are not necessarily all referring to the same embodiment. Any embodiment may be combined with any other embodiment, inclusively or exclusively, in any manner consistent with the aspects and embodiments disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, the data processing system can be part of a search engine configured to provide content to a web page server for display in an ad slot of a web page to a user, responsive to a search query from that user or to user access of the web page. The foregoing embodiments are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A computer implemented method of providing selected information, comprising:
   receiving an advertisement and keyword terms comprising a content keyword and a geographic term identifying a geographic location;
   generating a location criteria identifier that represents the geographic location indicated by the geographic term, the location criteria identifier comprising the geographic term and a plurality of variant terms of the geographic term, each of the plurality of variant terms identifying the geographic location identified by the geographic term, wherein the variant terms include at least one of an abbreviation, an alternate spelling, a misspelling, or a nickname of the geographic term;
   determining, from the keyword terms, a geographically modified keyword comprising the content keyword and the location criteria identifier, the geographically modified keyword indicating at least one of a product or a service that corresponds to the content keyword;
   storing the geographically modified keyword terms in association with the advertisement in a database of a data processing system;
   receiving a search query from a computing device;
   identifying a geographic location term in one of the search query or location preference of a user of the computing device;
   matching the identified geographic location term with the geographically modified keyword, wherein the identified geographic location term is a variant term of the location criteria identifier;
   identifying content associated with at least one of the product or the service responsive to the match; and
   providing the content for display at the computing device.

2. The method of claim 1, further comprising:
   generating a second location criteria identifier of the identified geographic location term; and
   matching the identified geographic location term with the geographically modified keyword based on the location criteria identifier of the geographically modified keyword and the second location criteria identifier.

3. The method of claim 1, further comprising:
   assigning a first location criteria identifier to the geographically modified keyword;
   assigning a second location criteria identifier to the identified geographic location term; and
   determining a match between the first location criteria identifier and the second location criteria identifier.

4. The method of claim 1, wherein matching the geographic location term further comprises:
   matching a location criteria identifier of the geographically modified keyword with a location criteria identifier of the identified geographic location term.

5. The method of claim 1, wherein the content keyword identifies the product or service, and wherein the search query includes a query keyword and the geographic location term, further comprising:
   identifying a match between the content keyword and the query keyword; and
   identifying a match between the geographic term and the geographic location term of the search query.

6. The method of claim 5, wherein the geographic term includes a first term corresponding to the geographic location, and wherein the identified geographic location term includes a second term corresponding to the geographic location, wherein the first term is different than the second term.

7. The method of claim 1, wherein matching the identified geographic location term with the location criteria identifier further comprises:
- determining a first location criteria identifier for a plurality of variants of the geographic location that corresponds to the geographic term;
- determining a second location criteria identifier for the identified geographic location term; and
- matching the first location criteria identifier with the second location criteria identifier based on a match between one of the plurality of variants of the geographic location identified in the geographically modified keyword and the identified geographic location term.

8. The method of claim 1, further comprising:
- assigning a location criteria identifier to the geographic location of the geographically modified keyword; and
- storing the location criteria identifier in the database.

9. The method of claim 1, wherein the geographically modified keyword corresponds to at least one of a plurality of content items of an online campaign, and wherein providing the content for display comprises:
- selecting one of the plurality of content items of the online campaign; and
- providing the selected content item for display responsive to the search query.

10. A system of providing information via a computer network, comprising:
- one or more data processing processors; and one or more storage devices storing instructions that when executed by the one or more data processors, cause the one or more data processors to perform operations comprising:
- receiving, by the one or more data processing processors, keyword terms comprising a content keyword and a geographic term identifying a geographic location;
- generating a location criteria identifier that represents the geographic location indicated by the geographic term, the location criteria identifier comprising the geographic term and a plurality of variant terms of the geographic term, each of the plurality of variant terms identifying the geographic location identified by the geographic term, wherein the variant terms include at least one of an abbreviation, an alternate spelling, a misspelling, or a nickname of the geographic term;
- determining, from the keyword terms, a geographically modified keyword comprising a content keyword and a location criteria identifier, the geographically modified keyword indicating at least one of a product or a service that corresponds to the content keyword;
- storing the geographically modified keyword terms in association with the advertisement in a database of a data processing system;
- receiving a search query from a computing device;
- identifying a geographic location term in one of the search query or location preference of a user of the computing device;
- matching the identified geographic location term with the geographically modified keyword, wherein the identified geographic location term is a variant term of the location criteria identifier;
- identifying content associated with at least one of the product or the service responsive to the match; and
- providing the content for display at the computing device.

11. The system of claim 10, further comprising:
- a database coupled to the one or more data processors and configured to store the geographically modified keyword.

12. The system of claim 10, wherein the geographically modified keyword includes a modifier, further comprising the one or more storage devices storing instructions that when executed by the one or more data processors, cause the one or more data processors to perform operations comprising:
- matching the identified geographic location term with the geographically modified keyword based at least in part on the modifier.

13. The system of claim 10, wherein the one or more storage devices storing instructions that when executed by the one or more data processors, cause the one or more data processors to perform operations comprising:
- assigning a first location criteria identifier to the geographically modified keyword;
- assigning a second location criteria identifier to the identified geographic location term; and
- determining a match between the first location criteria identifier and the second location criteria identifier.

14. The system of claim 10, wherein the one or more storage devices storing instructions that when executed by the one or more data processors, cause the one or more data processors to perform operations comprising:
- matching a location criteria identifier of the geographically modified keyword with a location criteria identifier of the identified geographic location term.

15. The system of claim 10, wherein the content keyword identifies the product or service, and wherein the search query includes a query keyword and the geographic location term, further comprising the one or more storage devices storing instructions that when executed by the one or more data processors, cause the one or more data processors to perform operations comprising:
- identifying a match between the content keyword and the query keyword; and
- identifying a match between the geographic term of the keyword terms and the geographic location term of the search query.

16. The system of claim 15, wherein the geographic term includes a first term corresponding to the geographic location, and wherein the identified geographic location term includes a second term corresponding to the geographic location, wherein the first term is different than the second term.

17. The system of claim 10, wherein the geographically modified keyword corresponds to at least one of a plurality of content items of an online campaign, further comprising the one or more storage devices storing instructions that when executed by the one or more data processors, cause the one or more data processors to perform operations comprising:
- selecting one of the plurality of content items of the online campaign; and
- providing the selected content item for display responsive to the search query.

18. A non-transitory computer readable storage device storing instructions that when executed by one or more data processors, cause the one or more data processors to perform operations comprising:
- receiving an advertisement and keyword terms comprising a content keyword and a geographic term identifying a geographic location;
- generating a location criteria identifier that represents the geographic location indicated by the geographic term, the location criteria identifier comprising the geographic term and a plurality of variant terms of the geographic term, each of the plurality of variant terms identifying the geographic location identified by the geographic term, wherein the variant terms include at least one of an abbreviation, an alternate spelling, a misspelling, or a nickname of the geographic term;

determining, from the keyword terms, a geographically modified keyword comprising the content keyword and the location criteria identifier, the geographically modified keyword indicating at least one of a product or a service that corresponds to the content keyword;

storing the geographically modified keyword terms in association with the advertisement in a database of a data processing system;

receiving a search query from a computing device;

identifying a geographic location term in one of the search query or location preference of a user of the computing device;

matching the identified geographic location term with the geographically modified keyword, wherein the identified geographic location term is a variant of the location criteria identifier;

identifying content associated with at least one of the product or the service responsive to the match; and providing the content for display at the computing device.

19. The non-transitory computer readable storage device of claim 18, further comprising instructions that when executed by the one or more data processors, cause the one or more data processors to perform operations comprising:

generating a second location criteria identifier of the search query based on the identified geographic location term; and matching the identified geographic location term with the geographically modified keyword based on the location criteria identifier of the geographically modified keyword and the second location criteria identifier.

20. The non-transitory computer readable storage device of claim 19, further comprising instructions that when executed by the one or more data processors, cause the one or more data processors to perform operations comprising:

assigning a location criteria identifier to the geographic location of the geographically modified keyword; and storing the location criteria identifier for storage in the database.

* * * * *